April 28, 1936. T. A. MITCHELL ET AL 2,038,589
ZINC SULPHIDE AND A METHOD OF MAKING THE SAME
Filed June 11, 1931
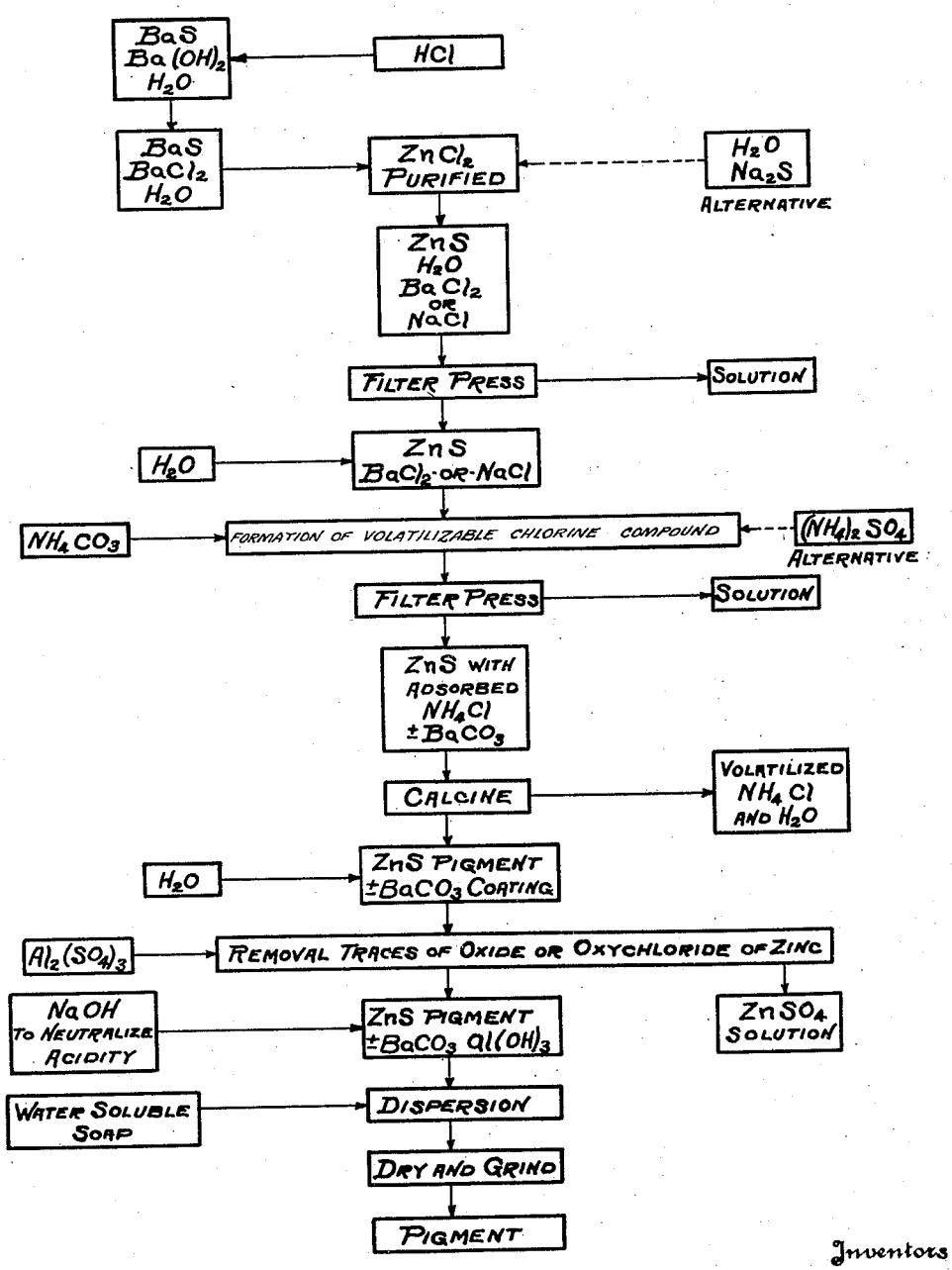
Inventors
THOMAS A. MITCHELL
ROYAL L. SESSIONS
By Clayton R. Jenks
Attorney Patented Apr. 28, 1936

2,038,589

UNITED STATES PATENT OFFICE 2,038,589

ZINC SULPHIDE AND A METHOD OF MAKING THE SAME

Thomas A. Mitchell and Royal L. Sessions, Denver, Colo., assignors, by mesne assignments, to Hughes-Mitchell Processes, Incorporated, Denver, Colo., a corporation of Wyoming Application June 11, 1931, Serial No. 543,735

27 Claims. (Cl. 134—78)

This invention relates to the manufacture of zinc sulphide and in particular to a product which will be suitable for use as a pigment.

Zinc sulphide has a high index of refraction of light and so serves efficiently as a protection to ward off sunlight from and so minimize its destructive action on the oil in a paint which serves as an impervious coating capable of protecting a surface from the weather. The ordinary commercial zinc sulphide has been found to darken upon exposure to sunlight and so to lose the brilliant white color which it imparts to a paint. One theory for this action which has been heretofore accepted is that the ultra-violet rays cause the decomposition of the zinc sulphide, producing metallic zinc and hydrogen sulphide which escapes to the air. During the night the metallic zinc becomes oxidized and the gray color presented by the metallic zinc is thereby transformed to a white color more nearly like that of the original pigment. This action of the sunlight is progressive, so that in time a considerable proportion of the zinc sulphide has been converted to zinc oxide, which does not have as desirable characteristics as are required for a pigment.

In accordance with this theory of darkening, it has been proposed to combine the zinc sulphide with other white substances or to coat the particles of zinc sulphide with a film of protective material which is fast to light. In many cases the coating material has not served to carry out the intended function because of its water soluble character or because it has been formed too early in the process and so has been removed by subsequent washing operations. This has been the case particularly when the coating material was added prior to calcination of the pigment. Zinc oxide has been a favorite coating material, but it does not have the brilliant white color of the sulphide, owing to its yellowing with age, and it is otherwise objectionable. Such a coating can do little more than prevent an observer from detecting the actual darkening of the zinc sulphide particle which has taken place beneath the coating.

A more recently accepted theory of darkening is that pure zinc sulphide is not broken down by the ultra-violet rays, but that darkening takes place if the pigment is contaminated by a metal chloride. Under the action of sunlight these metal chlorides are supposed to attack the zinc sulphide and make colored sulphides of the metal impurities, which serve to change the color of the paint. Hence, the present trend in the art is to remove the chlorides before muffling and not to rely on the aid of a protective film.

It is our belief that both of these theories are in part correct and that the darkening is actually caused by a progressive breaking down of the zinc sulphide due to the catalytic action of metal chlorides which may be present as impurities and that consequently a very small percentage of this metal chloride impurity is able to act over and over again in causing a relatively large amount of zinc sulphide to be converted by the ultra-violet rays to metallic zinc and, ultimately to the oxide. It is therefore highly desirable to eliminate metal chlorides from the zinc sulphide when it is to be used as a pigment. Also, we have determined that a coating on the zinc sulphide particle is useful, provided it serves to cover the particle to such an extent as to minimize or prevent the oxidation of the zinc sulphide during various operations of manufacture or during its use, and thus extend the life of the pigment.

We have found that the chloride ion is particularly useful in the manufacture of this pigment, as it permits one to start with a zinc chloride solution for the basic material and to use hydrochloric acid or other chloride ion reagents in the purification steps employed in the process. On the other hand the chlorides should not contaminate or be adsorbed on the zinc sulphide pigment particles.

It is accordingly one object of this invention to provide a process of making zinc sulphide, which is substantially free from contaminating metal chlorides, by steps involving the use of reagents containing the chloride ion and the final elimination of this ion from the reaction product.

It is another object of this invention to provide a zinc sulphide pigment not easily subject to darkening under the action of sunlight which is not only substantially free from metal chloride impurities but in which the pigment particles are coated with a protective material for the purpose of minimizing oxidation of the zinc sulphide.

Aside from the problem of the paint darkening when it stands in sunlight, there is the further problem involved in the fact that during the process of manufacture, there may be some oxidation of the zinc sulphide to zinc oxide which is not satisfactory as a pigment. Also it is desirable that the pigment be so treated that it will mix with or be dispersed readily in oil for use as a paint.

It is therefore a further object to so carry on the process that this undesired zinc oxide be eliminated if formed and that it be prevented from formation initially in so far as is feasible.

A further object is to provide zinc sulphide for use as a pigment which is free from objectionable impurities, and which has been so treated that it may be readily dispersed in oil for use as a paint.

Another object is to provide a cyclic method of making zinc sulphide by a process in which a metal sulphide reagent is employed and the resultant metal salt solution is converted economically to the sulphide for reuse in the process. Other objects will be apparent in the following disclosure.

Referring to the drawing, we have there illustrated diagrammatically the principal steps involved in making zinc sulphide pigment from zinc chloride and either barium or sodium sulphides.

In accordance with this invention, we propose to precipitate zinc sulphide from a zinc salt solution by means of a solution containing the sulphide ion, and preferably sodium sulphide or barium sulphide. For the zinc salt, we preferably use zinc chloride since the barium or sodium chloride produced by the reaction is soluble and can be readily separated from the zinc sulphide. Zinc sulphate may be used with sodium sulphide but it is not available in case barium sulphide is employed, since it would form an insoluble double salt of barium and zinc, which is not desired in a pigment of this type. These two sulphide reagents act alike, in general, and the steps of the process will be described as applying specifically to the use of barium sulphide, although the treatment of the pulp will be somewhat modified, as herein described, depending on which reagent is used.

When barium sulphide is dissolved in water it produces two compounds known as barium sulphydrate and barium hydrate in accordance with the following equation:

$$2BaS + 2H_2O = Ba(SH)_2 + Ba(OH)_2$$

Barium sulphide is ordinarily made by reducing barium sulphate by means of coal in a suitable furnace, the product being known as "black ash". If the barium sulphate contains iron or manganese, the solution of barium sulphide produced therefrom will contain free barium hydrate. Also, if the barium sulphate and the coal are wet, or if there is insufficient coal, or if the reaction is carried on under improper conditions, the solution may contain an excess of barium hydrate. Likewise, if the "black ash" stands too long or comes into contact with air, the oxidizing conditions tend to produce more barium hydrate than is indicated by the above equation.

When a pure solution of barium sulphide reacts on zinc chloride there should be produced hydrated zinc sulphide and soluble barium chloride. If, however, a crude barium sulphide is employed and there is an excess of barium hydrate in the solution due to the conditions of manufacture specified above, zinc hydrate will be precipitated along with the sulphide. Consequently, when the pigment is later calcined in a muffle, the zinc hydrate will form zinc oxide. Such muffled zinc oxide has an inferior color as compared with the extraordinary brightness of zinc sulphide and its presence should be avoided insofar as possible.

One feature of this invention comprises a way of so purifying the barium sulphide solution as to minimize the formation of zinc hydroxide when the sulphide is precipitated. We propose to do this by means of the chloride ion, and particularly by the use of hydrochloric acid, which serves to convert the excess of barium hydrate, over that indicated in the above equation, to barium chloride. It will be observed that barium chloride is a later reaction product produced when the zinc sulphide is precipitated, hence its presence at this stage is not detrimental. The neutralization of the excess barium hydrate will be preferably carried out by treating the barium sulphide solution with a calculated amount of hydrochloric acid as determined by analysis of the barium sulphide solution for its barium content and for the sulphide sulphur in accordance with standard analytical methods. This step in the process therefore results in the production of a barium sulphide solution having the correct ratio of barium sulphydrate and barium hydrate, and containing a slight amount of barium chloride.

The zinc chloride solution is likewise treated for removal of undesired materials, it being desirable to employ a solution which is free from soluble sulphates, sodium chloride and all metals capable of forming colored sulphides or other compounds. Iron and manganese, for example, may be precipitated and removed by means of potassium permanganate.

For precipitating the hydrated zinc sulphide we may employ solutions of any suitable concentration. It is merely essential that a slight excess of the barium sulphide be used to make sure that all of the zinc is precipitated. In carrying out this invention, we prefer to use a zinc chloride solution of approximately 50° Bé. while the barium sulphide solution may be 13° Bé. strength. The precipitation step is preferably carried on at a temperature of 75° C. or higher and with sufficient stirring to insure satisfactory results. We now have zinc sulphide as a precipitate or pulp and barium chloride in solution. If sodium sulphide is used, then the solution consists of sodium chloride.

A further feature of this invention involves the treatment of this pulp for removing the barium or sodium chloride. Instead of an immediate 100% dilution of the solution with water and the repeated excessive washing operations of the prior art, we filter the chloride solution immediately from the zinc sulphide pulp and thus secure it in concentrated form for further use. Thereafter the precipitate is introduced into water and repulped. This step is accomplished as soon as possible after the filtering operation. This zinc sulphide pulp is then allowed to settle and the supernatant weak solution is decanted. The precipitate is now ready to receive a special treatment for the removal of any adsorbed barium or sodium chloride.

The barium chloride solution is of high strength as it comes from the filter, and it may be used without requiring expensive concentrating methods. Since this process is preferably cyclic, the barium chloride thus recovered may be converted to blanc fixe or barium sulphate by the interaction of the barium chloride with salt cake, which is an impure sodium sulphate, thereby forming barium sulphate as a precipitate and sodium chloride in solution. This barium sulphate is available for the manufacture of more barium sulphide by reduction with coal in a suitable furnace, as is well understood in the art. It will be understood that the barium chloride solution may be further concentrated if desired for the purpose of this reaction on salt cake.

The removal of chloride ions, which are present with and supposed to be adsorbed on the zinc sulphide particle after separation from the solution, is preferably accomplished by means of a reagent which will convert the residual barium or sodium chloride to a harmless compound and at the same time leave the chlorine in a salt which may be readily volatilized or decomposed or otherwise removed during a subsequent operation. A satisfactory reagent for removing barium chloride is ammonium carbonate, which will serve to form barium carbonate and ammonium chloride; hence the chlorine of the previously adsorbed barium chloride is now in an easily volatilized material. Consequently during the subsequent heating of the zinc sulphide in a muffle, the barium carbonate will be left as a coating on the zinc sulphide particle, while the ammonium chloride will be volatilized and thus remove the chlorine from the zinc sulphide pigment. To remove adsorbed sodium chloride, we may employ such reagents as sulphuric acid or ammonium sulphate which produce hydrochloric acid or volatilizable ammonium chloride.

Our preferred manner of carrying out this step is to filter press the zinc sulphide and then repulp the material as often as the pigment will settle satisfactorily. When the material settles with difficulty, the ammonium carbonate or other desired reagent is added. The amount used is small. It is determined by analyzing the precipitate and solution (the pulp) for its total chloride content and then calculating the equivalent amount of reagent to be employed. We use 100 pounds of ammonium carbonate (anhydrous content) for each 70 pounds of total chlorine found in the pulp as barium chloride and 140 pounds of ammonium sulphate (anhydrous content) per 70 pounds of chlorine found as sodium chloride.

This preliminary filtration of the barium or sodium chloride solution from the zinc sulphide salt has been heretofore considered objectionable because it left an adsorbed film of strong barium or sodium chloride on the zinc sulphide, but by our method this adsorbed film is converted to a protective coating and a volatilizable material which is easily removed during the muffling operation. Consequently it is now possible to keep the barium or sodium chloride in a concentrated solution so that it may be easily used in subsequent recovery operations, thereby decreasing the cost of its recovery by a considerable amount.

The next step involves heating the pulp in a muffle, so as to remove the water of hydration from the zinc sulphide and to shrink it to its maximum density and give it a maximum covering power as a pigment. For this purpose, after the solution has been removed from the zinc sulphide as described, the pigment is crushed to a desired size. Then it may be muffled directly or after it has been dried to 10 or 15% content of moisture. The muffling may be accomplished in any suitable apparatus, the exact construction of which is not a part of the present invention, which will serve for heating the material in a controlled atmosphere and preferably under conditions which minimize or avoid oxidation of the zinc compound. An atmosphere of carbon monoxide, carbon dioxide, steam or other inert or non-oxidizing gas is preferably used. For example, we may use about 1 or 2% of carbon monoxide.

There is no critical temperature for this drying operation, but the temperature range employed will depend upon the time allowed. The lower the temperature, the longer will be the time required. We prefer to use a temperature between 650° and 750° C., the exact degree depending upon the requirements to be met in the finished product. The duration of the operation should be controlled to prevent the material from being over-shrunk and too hard on the one hand, and to insure on the other hand that the pigment has the maximum covering power and the proper oil absorption coefficient. It is also desirable to grind and so classify the material as to produce particles of about the same diameter and to reject the coarse and fine material. This control of particle size assures a uniform treatment. Also dehydrating agents, such as sulphuric acid, may be used to decrease the time required to bring about a satisfactory dehydration and shrinkage of the particles.

If the temperature of muffling is high, incipient fusion may take place and make the particle smooth, or if the temperature is lower the particle will remain rough surfaced. Smooth particles are more readily wetted than are rough particles, but if the surface is oxidized it is less easily wetted as the degree of oxidation increases. Hence the wettability of the zinc sulphide particle by the oil of the paint is a function of the temperature of muffling. If zinc oxide is present and the temperature too high, the oxide may be fused onto the surface of the zinc sulphide particle, and in such a case, it is difficult to remove it later. Hence it is desirable to avoid oxidizing conditions and to control the temperature to avoid sintering or the formation of a particle having zinc oxide fused thereon. Hence we so carry on the calcining operation as to obtain that degree of smoothness and that shape of the particle, as well as that chemical condition, which makes a pigment capable of being easily dispersed in the oil of the paint.

During this muffling operation the water present in the zinc sulphide will be removed and the ammonium chloride which carries the chlorine formerly adsorbed on the pigment particles will be volatilized and thus removed from the pigment, while any barium carbonate present will form a protective coating on the zinc sulphide particle. This hot zinc sulphide pigment may now be cooled, as by quenching in cold water, and thereafter ground in water to produce a fine slurry which is satisfactory for the subsequent conditioning treatment.

It will now be understood that in accordance with this aspect of our invention, we accomplish the production of zinc sulphide pigment by a process involving the purification of reagent materials by means of hydrochloric acid and the subsequent muffling of the pigment sulphide in the presence of the adsorbed chloride but in a controlled and preferably non-oxidizing atmosphere. The presence of the adsorbed chloride during this heating operation has done no harm since the chloride is completely removed from surface contact with the zinc sulphide particle and escapes into the muffle atmosphere and ultimately leaves the field of action.

If any zinc oxide or zinc oxychloride should be present after the above muffling and quenching operations, these would tend to cause the zinc sulphide pigment to turn yellow and to affect detrimentally its property of dispersing properly in oil. We propose to condition the pigment after the above described preparatory treatment and eliminate substantially the last trace of zinc oxide or zinc oxychloride and thereby to produce either a neutral zinc sulphide or one of a uniform percentage of zinc sulphide to which a subsequent dispersion treatment may be satisfactorily applied. To this end, we treat the pigment with a material which will convert the zinc oxide or oxychloride to a harmless ingredient capable of being removed easily, as by a washing operation. As a suitable reagent for this purpose we may employ one yielding sulphate ions in solution and preferably sulphuric acid, or salts which have an acid reaction such as sodium-hydrogen sulphate, aluminum sulphate, titanium sulphate, and other similarly acting materials, which may be employed separately or in any desired combination. The aluminum and titanium salts will produce beneficial coatings of hydrates on the surface of the zinc sulphide particle, thereby aiding further in protecting this sulphide against atmospheric oxidation as well as to conceal any darkening which may take place in the zinc sulphide under the action of sunlight.

Although this zinc oxide or the oxychloride which may be present may be removed during the quenching operation, it is preferred to accomplish this after the material has been wet ground to form a slurry so that it may be easily treated and the operation more satisfactorily controlled. This step of dissolving the oxide or oxychloride is accomplished by the simple procedure of mixing therewith a required amount of sulphuric acid or the metal sulphate solution, and the methods of control will be in accordance with standard chemical practice. This results in the formation of soluble zinc sulphate and, if the aluminum or titanium sulphates are employed, the production of the hydroxide of one of these metals, which will be a precipitate forming a protective coating on the particles of zinc sulphide.

The sulphate solution is now filtered from the slurry and the soluble impurities are washed out to a desired extent. The slight acidity of the material, if any, may now be neutralized by the addition of sodium carbonate or hydrate. In accordance with the last steps of the procedure above outlined, we have not only removed the final traces of chlorine which may be present as zinc oxychloride but we have also removed the zinc oxide from the pigment and have left the zinc sulphide with a protective coating material, the nature of which depends on the chemical employed in the reaction.

In order to impart to the finished zinc sulphide a definite ability to disperse in a paint vehicle, such as oil, various treatments may be employed in accordance with our practice. Our preferred way of making the zinc sulphide able to disperse readily or to mix satisfactorily with oil may be accomplished by rapidly agitating the neutral zinc sulphide slurry with a solution of a water soluble soap. This tends to produce a coating of soap on the fine particles of zinc sulphide which will not cause blubbering or thickening of the paint, as will an oil soluble soap. If a paint becomes thickened because of the use of an oil soluble soap, this necessitates the use of a thinner, such as turpentine, with a consequent decrease in covering power of the paint and so requiring the application of a greater number of coats to the surface being painted. The water soluble soap does not have this objectionable characteristic.

Various soaps may be employed, such as the ordinary household laundry soaps, stearate soaps, vegetable oil soaps, resin soap, or sulfonated castor oil soap, which have sodium, ammonium or other bases and which are sufficiently soluble in water for the purpose of producing an adsorbed film on the zinc sulphide particle and to hold the particles separated and prevent their forming aggregates. The concentration of the water solution may be as desired for the final product, but we prefer to employ a dilute solution having not over 5% of the soap therein. The temperature may also be controlled and held preferably below the boiling point. Agitation of the slurry of zinc sulphide assists the operation. The amount of soap added to the pigment need not be large. For example, we may use less than 1% of soap for a given weight of dry zinc sulphide. After this treatment, the pigment may be dried and disintegrated and made ready for mixing with oil for producing the paint. Owing to the presence of the soap film, the pigment is wetted easily by the oil and so disperses and mixes readily, thus producing a paint of superior hiding power and ease of application as well as other desired characteristics.

By this method, we have made a zinc sulphide pigment which is substantially free from any metal sulphides which add undesired colors to the white pigment or aid in converting the zinc sulphide to a darkened material. The pigment is substantially free from zinc oxide and from metal chlorides. It is strongly resistant to the ultraviolet rays of sunlight and has a superior whiteness and a high index of refraction. It will also carry a protective light resistant coating which masks any darkening action of the zinc sulphide particle when aluminum or titanium sulphate is used as above indicated. The pigment disperses readily in oil and has a high covering power. Various other advantages will be apparent in the above disclosure.

The expression "a zinc sulphide pigment derived by precipitation from a zinc chloride solution", as found in the preamble to the product claims, is intended to limit such claims to those zinc sulphide pigments which have been made by precipitation of the sulphide from a zinc chloride solution and which tend to be contaminated by adsorbed chlorine and oxygen compounds of zinc. The pigment as produced by this process has definite characteristics imparted thereto by a treatment intended primarily for the elimination of such compounds, and all of the characteristics thus acquired, whether known or not, serve to identify this pigment; hence the claims are to be interpreted in this light.

Having thus described our invention, what we claim as new and desire to secure by Letters Patent is:

1. The method of making zinc sulphide comprising the steps of providing an impure water solution of a metal sulphide containing hydroxyl ions which is capable of precipitating zinc sulphide and hydroxide from a reagent solution of zinc chloride, adding to the metal sulphide solution an acid in amount sufficient to neutralize such hydroxyl ions therein as are capable of precipitating zinc hydroxide from the reagent solution, then employing the neutralized sulphide solution to precipitate zinc sulphide from said reagent solution and thereby obtaining the sulphide free from zinc hydroxide, and thereafter calcining the zinc sulphide and obtaining the same as a pigment free from its oxide.

2. The method of making zinc sulphide comprising the steps of dissolving crude barium sulphide in water, treating the solution with hydrochloric acid to neutralize any excess of hydroxyl ions over the theoretical requirements of a hydrolyzed solution of barium sulphide, treating zinc chloride in solution with said neutralized barium sulphide solution to precipitate zinc sulphide and thereafter separating the solution from the zinc sulphide.

3. The method of making a zinc sulphide pigment comprising the steps of dissolving barium sulphide in water, neutralizing any excess of hydroxyl ions over the theoretical requirements of a hydrolyzed solution of barium sulphide by means of an acid containing chloride ions, precipitating zinc sulphide from a chloride solution by means of said neutralized barium sulphide solution, separating the zinc sulphide from the solution, removing any chloride which may be adsorbed on the zinc sulphide pulp and calcining the latter to remove the water of hydration.

4. The method of forming zinc sulphide comprising the steps of treating a zinc salt solution with a solution containing sulphide ions and precipitating said zinc sulphide, separating the solution from the zinc sulphide and thereafter converting residual adsorbed material on the zinc sulphide pulp to a volatilizable material and volatilizing the same to remove it.

5. The method of purifying zinc sulphide of a material containing adsorbed chloride ions comprising the steps of treating the material with a reagent capable of forming a volatilizable chloride by reaction with said adsorbed material and thereafter heating the mass to volatilize and remove said chloride.

6. The method of making zinc sulphide comprising the steps of combining solutions of barium sulphide and zinc chloride and precipitating zinc sulphide, filtering the solution from the zinc sulphide pulp and treating the pulp with a chemical capable of forming a volatilizable metal chloride by reaction with such barium chloride as remains with the zinc sulphide and subsequently heating the material to volatilize said metal chloride.

7. The method of making zinc sulphide according to claim 2 in which the zinc sulphide containing adsorbed barium chloride is treated with a material capable of transforming chlorine to a volatilizable chloride and the mass is thereafter heated to volatilize the chloride and leave a barium compound with the pigment.

8. The method of making zinc sulphide comprising the steps of treating a zinc chloride solution with barium sulphide to form zinc sulphide and barium chloride, removing the solution from the precipitate and subsequently treating the precipitate with ammonium carbonate to form barium carbonate and ammonium chloride with any barium chloride present with the precipitate and thereafter heating the product to volatilize the ammonium chloride thus formed and remove chlorine from the zinc sulphide.

9. The method of making zinc sulphide comprising the steps of precipitating said sulphide from a zinc chloride solution by means of sodium sulphide, separating the precipitate from the solution and treating the zinc sulphide with a reagent capable of reacting with any sodium chloride present to form a compound which volatilizes when the zinc sulphide is subsequently heated and thereafter heating the material to remove the water of hydration from the zinc sulphide and to volatilize said compound.

10. The method of making zinc sulphide comprising the steps of treating a zinc chloride solution with sodium sulphide and forming zinc sulphide and sodium chloride, separating the solution from the precipitate and treating the latter with a solution containing the sulphate radical and capable of forming a volatilizable chloride by reaction with the sodium chloride and thereafter heating the material to volatilize said chloride and to remove water of hydration from the zinc sulphide.

11. The method of forming zinc sulphide comprising the steps of treating a zinc salt solution with a solution containing the sulphide ion and precipitating zinc sulphide, separating the solution from the precipitate without diluting the solution, then repulping the precipitate in water and subsequently calcining the zinc sulphide to remove the water of hydration.

12. The method of making zinc sulphide comprising the steps of precipitating zinc sulphide from a zinc chloride solution by means of barium sulphide, separating the barium chloride solution from the pulp without first diluting the same, and thereafter removing any barium chloride which may be present with the zinc sulphide.

13. The method of treating zinc sulphide precipitated from a zinc salt solution and heated to remove the water of hydration comprising the steps of dissolving any zinc oxide or oxychloride on the zinc sulphide particle by means of a solution of aluminum sulphate and precipitating aluminum hydroxide as a protective coating on the particle.

14. The method of making zinc sulphide pigment comprising the steps of precipitating zinc sulphide from a zinc chloride solution and subsequently calcining the pigment, which result in the formation of anhydrous zinc sulphide coated with zinc oxide or oxychloride, thereafter dissolving said coating compound and precipitating on the pigment a protective coating of a metal hydrate, and rendering the pigment readily dispersible in oil without removing the coating.

15. The method of making zinc sulphide pigment comprising the steps of preparing hydrated zinc sulphide and calcining the same, which produce anhydrous zinc sulphide having a coating thereon containing zinc oxide or oxychloride, and thereafter treating the pigment with a sufficient amount of a sulphate of a metal of the group consisting of aluminum and titanium to remove said coating compound and precipitate on the pigment a coating of the hydrate of said metal, and subsequently treating the pigment to render it readily dispersible in oil without removing the coating thereon.

16. The method of making zinc sulphide pigment comprising the steps of precipitating zinc sulphide from a zinc chloride solution and calcining it and thereby forming anhydrous zinc sulphide coated with a zinc-chlorine compound, and thereafter treating the calcined pigment with an acid reagent in amount sufficient to remove the coating of said compound, and rendering the pigment readily dispersible in oil.

17. The method of claim 16 in which the acid reagent is a sulphate of a metal of the group consisting of aluminum and titanium and in which a coating of the hydrate of said metal is precipitated on the pigment particles.

18. The method of forming zinc sulphide comprising the steps of treating zinc chloride in solution with a reagent of one of the group consisting of barium and sodium sulphides and precipitating substantially all of the zinc as zinc sulphide, thereafter separating the resultant chloride solution from the precipitate without first diluting the solution, whereby values may economically be recovered from the solution, and subsequently removing any adsorbed chloride ions which are present on the zinc sulphide and providing a zinc sulphide pigment which is free from a chlorine compound.

19. The method of making zinc sulphide pigment comprising the steps of treating a zinc chloride solution with a metal sulphide which is capable of and proportioned for precipitating all of the zinc in solution as zinc sulphide, removing the solution from the precipitate, forming a volatilizable chlorine compound with the chlorine content of any occluded salt on the pigment, calcining the material to dehydrate the zinc sulphide and to volatilize said compound, removing from the pigment any trace of the chlorine of said occluded salt, and thereafter giving the pigment a neutral reaction and then rendering it uniformly dispersible in oil.

20. The process of making a zinc sulphide pigment after hydrated zinc sulphide has been precipitated and calcined to remove the water of hydration and after deleterious substances have been removed therefrom comprising the steps of adding to the calcined product a sufficient amount of chemical having an acid reaction capable of converting to a water soluble salt any zinc oxide or oxychloride formed during the preparatory treatment, washing said salt from the pigment and neutralizing any residual acid in the pigment, whereby the latter may be conditioned uniformly for proper dispersion in oil.

21. The method of making zinc sulphide pigment comprising the steps of precipitating zinc sulphide from a zinc chloride solution, removing the solution from the precipitate, subsequently heating the precipitate in a muffle to remove the water of hydration, treating the muffled product with a solution containing sulphate ions to remove any zinc oxide or oxychloride present on the pigment, treating the pigment to give it a neutral reaction and subsequently conditioning the pigment to render it easily dispersible in oil.

22. The method of making zinc sulphide comprising the step of treating a zinc chloride solution with a metal sulphide to form a zinc sulphide precipitate, filtering the solution therefrom, treating the pulp to remove any adsorbed chloride ions, heating the pulp to remove the water of hydration and finally removing substantially the last trace of chlorine from the zinc sulphide.

23. The method of claim 5 in which the pigment particle, after calcination and removal of substantially all of the adsorbed chloride ions, is treated to remove any trace of zinc chloride or oxychloride.

24. The method of claim 5 in which the pigment particle, after calcination, is treated to remove any trace of zinc chloride or oxychloride and is thereafter treated to impart a controlled alkalinity thereto and render the pigment readily dispersible in oil.

25. The method of making zinc sulphide pigment comprising the steps of precipitating zinc sulphide from a zinc chloride solution, calcining the precipitate to remove water of hydration and form a material suitable for a pigment, and thereafter treating the calcined pigment to remove the residual zinc-chlorine compound which may be present.

26. The method of claim 25 in which the residual zinc-chlorine compound is removed by treating the pigment with a sulphate of a metal capable of forming a protective coating on the pigment particle of the hydrate of said metal and which will remain white in color under the action of sunlight.

27. The method of making a pigment comprising the steps of precipitating hydrated zinc sulphide from a zinc salt solution, separating the precipitate from the solution, grinding and classifying it to produce particles of substantially a uniform size and thereafter heating the particles in a non-oxidizing atmosphere and under controlled temperature and time conditions to remove the water of hydration and shrink the zinc sulphide to a smooth particle which is not hard, oxidized or sintered and which has the maximum covering power and is readily dispersed in oil.

THOMAS A. MITCHELL.
ROYAL L. SESSIONS.